G. F. VOIGHT.
MOTOR VEHICLE SPRING SUSPENSION.
APPLICATION FILED MAY 4, 1918.
1,281,109.
Patented Oct. 8, 1918.
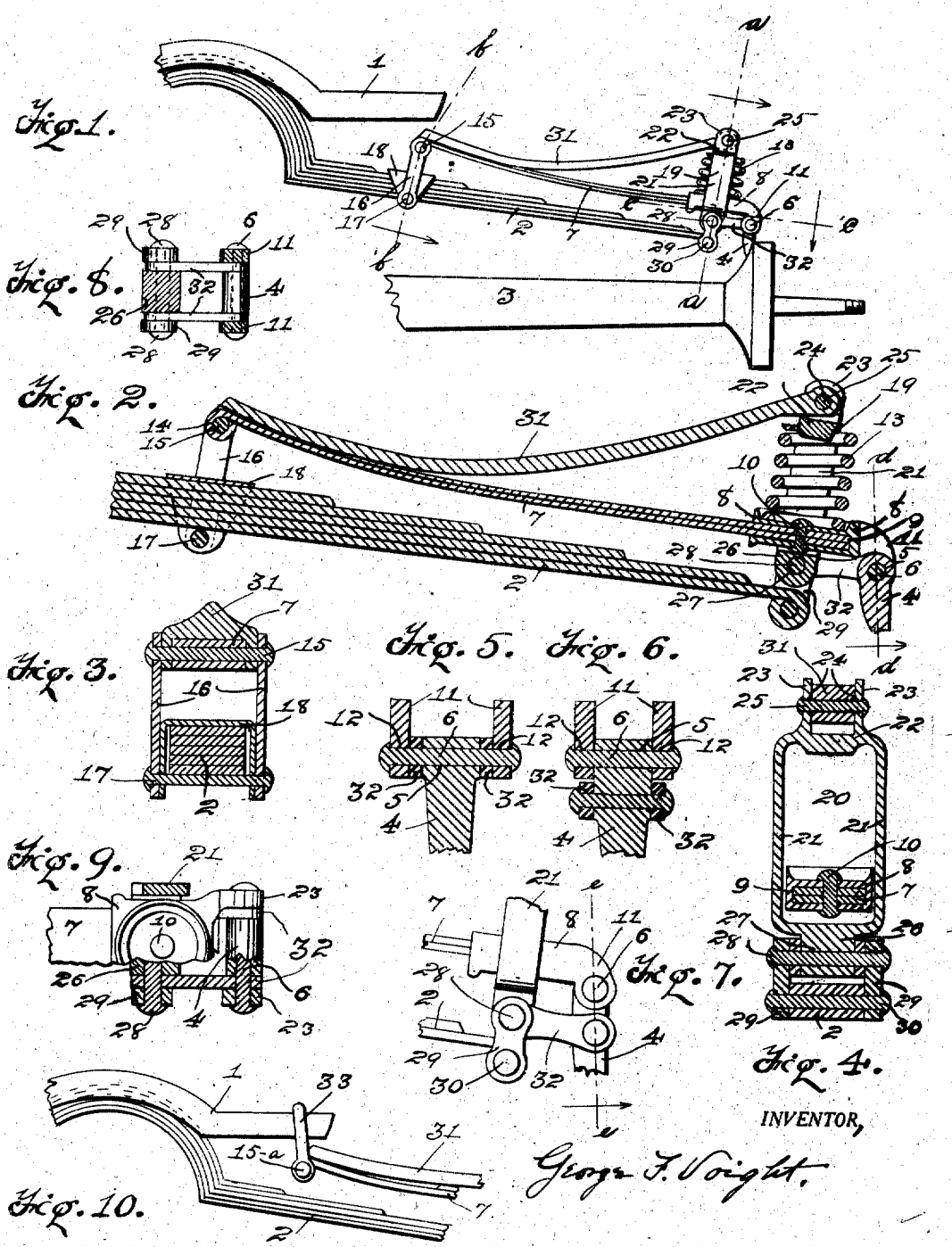
INVENTOR,
George F. Voight.

UNITED STATES PATENT OFFICE.

GEORGE F. VOIGHT, OF SAN FRANCISCO, CALIFORNIA.

MOTOR-VEHICLE SPRING SUSPENSION.

1,281,109.

Specification of Letters Patent.  Patented Oct. 8, 1918.

Application filed May 4, 1918. Serial No. 232,609.

*To all whom it may concern:*

Be it known that I, GEORGE F. VOIGHT, a citizen of the United States, residing at San Francisco, in the county of San Francisco and State of California, have invented new and useful Improvements in Motor-Vehicle Spring Suspensions, of which the following is a specification.

My invention relates to motor vehicle spring suspensions in which levers and auxiliary springs coöperate with the vehicle's principal leaf spring.

One of the objects of my improvements being to provide means for assisting the principal leaf spring to cushion the vehicle against the unevenness of the road, particularly for the minor unevennesses; another object being to provide means for such purpose in which an oscillatory lever is pivoted at one end to the vehicle running-gear while the other end of the lever is coupled up with a portion of the vehicle that is resiliently supported and in which an outer end of the principal leaf spring is supported by the lever; with other and further objects and purposes in view which will appear as the description proceeds, the invention resides in the combination and arrangement of parts and in the details of construction of parts hereinafter described and claimed, it being understood that changes in the precise embodiment of the invention herein disclosed can be made within the scope of what is claimed without departing from the spirit of the invention.

In the drawings—

Figure 1 is a rear-end elevation of a portion of the right-hand side of a motor vehicle with my improvements applied thereto.

Fig. 2 is a vertical sectional view of the invention and a portion of the vehicle's principal leaf spring.

Fig. 3 is a sectional view on line *b b*, Fig. 1.

Fig. 4 is a sectional view on line *a a*, Fig. 1, with the auxiliary coil spring removed.

Fig. 5 is a sectional view, on line *d d*, Fig. 2.

Fig. 6 is a sectional view on line *e e*, Fig. 7, of a modified form.

Fig. 7 is an elevation of a portion of the invention in a modified form.

Fig. 8 is a plan view on line *c c*, Fig. 1.

Fig. 9 is a plan view of a portion of the invention, certain parts being in section.

Fig. 10 is a rear elevation of a portion of the vehicle frame and principal leaf spring and a fragment of the invention in a modified form.

Like numerals refer to like parts throughout the several figures.

Referring to the drawings,—

1 designates a vehicle frame supported by a bowed principal leaf spring 2 over-hanging and extending in a general direction with an axle 3. To the axle 3 is rigidly secured an up-standing perch 4 provided with a transversely extending opening 5 at its upper end, in which is rotatably fitted a pivot pin 6 pivotally supporting one end of an oscillatory leaf spring lever 7. I prefer to make the lever 7 out of two pieces of flat resiliently flexible steel of dimensions consistent with the requirements, disposed flat side to flat side, however any number of leaves may be employed as desired and as may be found expedient. To one end of the leaves forming the lever 7, I rigidly secure a base 8, provided for said purpose with a chamber 9 which is open at one end for the entrance of said ends of the leaves. The said ends of the leaves being further secured in the chamber by means of a rivet 10 extending through both the upper and lower walls of the chamber and through said ends. The base 8 forms the pivotal point for the lever 7, and for that purpose is provided with a pair of downwardly extending ears 11 11 having openings 12 12 through which extend the outer ends of the pivot pin 6. The base 8 also forms a seat for a coil compression spring 13, the functions of which will hereinafter be fully explained. At the inner or free end of one of the leaves forming the lever 7 is a transverse opening 14 fitted with a pivot pin 15 supported by a pair of oscillatory links 16 16 supported at their lower ends by a pivot pin 17 supported by the free ends of an inverted stirrup 18 seated upon and supported by the principal leaf spring 2. 19 is a hanger having a comparatively large central opening or slot 20, and embodying a pair of side pieces 21 21 disposed one on each side of the base 8 and the spring 13, an upper end 22 seated upon the upper end of the spring 13 and provided with a pair of up-standing ears 23 23 spaced a distance apart and having openings 24 24 fitted with a pivot pin 25, and a lower end piece 26 disposed below the base 8 and provided with an opening 27 in which is rotatably fitted a pivot pin 28 supporting the upper ends of shackle links 29 29 supporting at their lower ends a pivot pin 30 pivotally supporting one end of the principal leaf spring 2.

31 is a non-flexible lever disposed above the flexible lever 7 and extending in a general direction therewith and having its inner end closely coupled up with the inner or free end of the latter by means of the pivot pin 15. The non-flexible lever 31 is bowed downwardly intermediate its ends and adapted to bear downwardly operatively upon the intermediate portion of the flexible lever with its outer or free end disposed at a distance above the latter, and resiliently yieldingly held at said distance by the tension of said flexible lever. It will therefore be seen that the hanger 19, to the upper end of which the outer or free end of the non-flexible lever is connected and to the lower end of which the outer end of the principal leaf spring is coupled, is yieldingly supported by the resiliency of the outer end of the flexible lever 7, and that the arrangement may resiliently support an end of the principal leaf spring. The hanger 19 is also resiliently supported by the compression coil spring 13 confined in the opening 20 of the hanger, between the upper end of the latter and the upper side of the base 8. The base 8 having on its upper side a circular concaved portion forming a seat for the lower end of the compression spring 13.

32 32 designates a pair of oscillatory radius links having their outer ends pivotally supported by the pivot pin 6 and disposed between the ears 11 11 and the perch 4 and their inner or free ends flexibly coupled to the pivot pin 28 and disposed between the shackle links 29 29 and the lower end piece 26. Said links being adapted to guide the lower end piece 26 along a predetermined line or course in its upwardly and downwardly movements. The outer ends of the links 32 32 may, of course, be equally well disposed and pivoted on the pivot pin 6 at the outside of the ears 11 11 as at the inner side thereof, and if so desired they may be pivotally supported by the perch 4 at a point below the pivotal point of the flexible lever 7, as plainly shown in Figs. 6 and 7 which show a modification of the preferred form. Or, if desired, the outer ends of the links may be pivotally supported at a suitable point on the base 8 at a proper distance from the hanger 19.

In the modification shown in Fig. 10, the inverted stirrup 18 and the links 16 16 used with the preferred form, are dispensed with, and the inner ends of the levers 7 and 31 are suspended from the frame 1 by means of a bifurcated hanger 33 straddling the frame from the upper side thereof and having its two depending arms pivotally connected to the pivot pin 15ᵃ.

While I have shown my invention as applied to the rear right-hand side of a vehicle, it is to be understood that it is applicable to the left-hand side as well as to the right-hand side, and to the front as well as to the rear of any vehicle.

Throughout the foregoing specification and the claims hereinafter following, to facilitate designating the relative position of the different portions and members composing the several parts of the invention, the term, outer end, or, outer ends, shall designate the end or ends nearest to the outer end of the vehicle axle, and the term, inner end, or, inner ends, shall designate the end or ends farthest from said outer end of the vehicle axle. The outer end of the vehicle axle meaning, of course, the end on the side of the car to which the device is applied.

I claim:

1. The combination with the frame, axle and principal leaf spring of a motor vehicle, of an oscillatory flexible leaf spring lever having its outer end pivotally supported by the axle and having a relatively movable support for its inner end, the lever being disposed above an outer section of the principal leaf spring and extends in a general direction therewith, a coiled compression spring seated upon the lever intermediate its ends, and a connection between said compression spring and one end of the principal leaf spring.

2. The combination with the frame, axle and principal leaf spring of a motor vehicle, of an oscillatory flexible lever pivotally supported at its outer end by the axle, a relatively vertically movable support for its inner end, a coiled compression spring seated upon said lever adjacent its outer end, a hanger having sections extending above and below said lever, a connection between the upper section of the hanger and said compression spring whereby said compression spring may resiliently support said hanger, said hanger being slidable longitudinally of itself relatively to the lever, and a connection between the lower section of the hanger and one end of the principal leaf spring.

3. In a device of the character described, the combination with an oscillatory lever pivotally supported at its outer end by the vehicle's axle and having a r[el]atively movable support for its inne[r] [e]nd, [t]he lever carrying a coil compression [s]pri[ng] between its ends adapted to support a hanger having an upper section extending up above the lever and a lower section extending below the lever, the hanger being movable longitudinally of itself relatively to the lever with and against the tension of said compression spring, the hanger being adapted to support one end of the vehicle's principal leaf spring, of an oscillatory radius link having its inner end flexibly coupled to said lower section of the hanger and its outer end pivotally supported by a relatively stationary support.

4. The combination with the frame, axle and principal leaf spring of a motor vehicle, of an oscillatory lever pivotally supported at its outer end by the axle, a connection between the inner end of the lever and a support vertically movable relatively to the axle, a coil compression spring seated upon the lever intermediate its ends, an element having a section extending above the lever supported by said compression spring, and another section extending down below the lever pivotally connected to one end of the principal leaf spring, and a radius link having its inner end pivotally connected to said element and its outer end pivotally connected to the axle.

5. In a device of the character described, the combination with an oscillatory lever flexibly coupled at its outer end to the vehicle axle, and a connection between the inner end of said lever and a portion of the vehicle subject to rebound, of a spring carried by said lever intermediate its ends, said spring having a free end projecting upwardly from said lever, said free end being movable downwardly relatively to said lever against the tension of said spring, a hanger having its upper end supported by said free end of the spring and its lower end pivotally supporting one end of the vehicle's principal leaf spring, an oscillatory radius link having one end pivoted to said lower end of the hanger, and a pivotal support for the other end of said radius link, said hanger being movable relatively to said pivotal support.

6. In a device of the character described, the combination with an oscillatory lever having a pivotal support for its outer end and a relatively movable support for its inner end, of a second lever disposed above said oscillatory lever and extending in a general direction therewith, a non-resilient connection between the levers adjacent their inner ends, and a resilient connection between the levers adjacent their outer ends, the second lever being adapted to support one end of the vehicle's principal leaf spring.

7. In a device of the character described, the combination with an oscillatory flexible leaf spring lever having its outer end pivotally supported by the vehicle's axle and its inner end supported by a relatively movable support, of a non-flexible lever disposed above said flexible lever and extending in a general direction therewith, a connection between the levers adjacent their inner ends, and a resilient connection between the levers adjacent their outer ends, the outer end of the non-flexible lever being adapted to support one end of the vehicle's principal leaf spring.

8. The combination with the frame, axle and principal leaf spring of a motor vehicle, of an oscillatory flexible leaf spring lever having its outer end pivotally supported by the axle, the lever having a section disposed above an outer section of the principal leaf spring, a connection between the inner end of the levers and a support vertically movable relatively to the axle, a second lever disposed above said oscillatory lever and extending in a general direction therewith, a substantially rigid connection between the inner ends of the levers, a section of each of said levers intermediate their ends being in bearing engagement with each other, the outer ends of the levers being normally spaced a distance apart, and a connection between the outer end of the second mentioned lever and one end of the principal leaf spring.

9. The combination with the frame, axle and principal leaf spring of a motor vehicle, of an oscillatory flexible leaf spring lever having its outer end pivotally supported by the axle, a connection between the inner end of the lever and a support vertically movable relatively to the axle, a non-flexible lever disposed above said flexible lever and extending in a general direction therewith, a connection between the inner ends of the levers, a section of the non-flexible lever intermediate its ends being disposed in bearing engagement with a registering section of the flexible lever, the levers being spaced apart adjacent their outer ends, and a connection between the non-flexible lever adjacent its outer end and one end of the principal leaf spring.

10. The combination with the frame, axle and principal leaf spring of a motor vehicle, of an oscillatory flexible leaf spring lever having its outer end pivotally supported by the axle, a relatively movable support for its inner end, a non-flexible lever disposed above the flexible lever and extending in a general direction therewith, the non-flexible lever having an intermediate downwardly bowed section riding upon the upper side of a registering section of the flexible lever, the arrangements being such that the outer end of the non-flexible lever will be projected upwardly from the flexible lever and normally yieldingly maintained at said upwardly projected position by the tension of the flexible lever, and a pivotal connection between the non-flexible lever adjacent its outer end and one end of the principal leaf spring.

11. The combination with the frame, axle and principal leaf spring of a motor vehicle, of an oscillatory flexible leaf spring lever having its outer end pivotally supported by the axle and having relatively movable support for its inner end, of a non-flexible lever disposed above the flexible lever and extending in a general direction therewith, the non-flexible lever having intermediate its ends a downwardly bowed section seated upon and being supported by a registering section of the flexible lever, the outer section of the non-flexible lever being normally deflected upwardly from a registering section of the flexible lever, said upwardly deflected section being movable downwardly against the tension of the flexible lever, and a link connection between the non-flexible lever adjacent its outer end and one end of the principal leaf spring.

12. In a device of the character described, an oscillatory flexible leaf spring lever having its outer end pivotally supported by the vehicle axle, a non-resilient connection between the inner end of the lever and a support movable relatively to the axle, and a resilient connection between the lever intermediate its ends and one end of the vehicle's principal leaf spring.

13. In a device of the character described, an oscillatory flexible leaf spring lever having its outer end pivotally connected to the vehicle axle, a non-resilient connection between the inner end of the lever and a support vertically movable relatively to the axle, and a pivotal connection between the lever intermediate its ends and one end of the vehicle's principal leaf spring.

14. In a device of the character described, an oscillatory lever having its outer end pivotally connected to a support rigidly supported by the vehicle axle, a relatively movable support for the inner end of the lever, a connection between one end of the vehicle's principal leaf spring and said first mentioned support, said connection comprising a plurality of links, and a resilient connection between a section of said links and the lever intermediate its ends.

GEORGE F. VOIGHT.